United States Patent [19]

Lundquist

[11] Patent Number: 4,953,503

[45] Date of Patent: Sep. 4, 1990

[54] WINDOW-MOUNTED BIRD FEEDER APPARATUS

[76] Inventor: Timothy Lundquist, P.O. Box 386A, Tivoli, N.Y. 12583

[21] Appl. No.: 292,900

[22] Filed: Jan. 3, 1989

[51] Int. Cl.$^5$ ..................... A01K 39/01; A01K 39/04
[52] U.S. Cl. ................................ 119/51.01; 119/57.8
[58] Field of Search .................. 119/52.2, 57.8, 51.01, 119/52.1, 26

[56] References Cited

U.S. PATENT DOCUMENTS

| D. 274,013 | 5/1984 | Sun | 119/57.8 |
|---|---|---|---|
| 2,430,541 | 11/1947 | Thatcher | 119/57.8 |
| 2,624,310 | 1/1953 | Smithson | 119/26 |
| 2,640,224 | 6/1953 | George | 119/52.2 |
| 2,720,188 | 10/1955 | Hofrichter | 119/26 |
| 3,291,100 | 12/1966 | Negaard | 119/57.8 |
| 3,919,977 | 11/1975 | Clark | 119/52.2 |
| 4,261,294 | 4/1981 | Bescherer | 119/57.8 |
| 4,361,116 | 11/1982 | Kilham | 119/26 |
| 4,660,507 | 4/1987 | Lay | 119/26 |

Primary Examiner—Paul J. Hirsch
Attorney, Agent, or Firm—Charles J. Brown

[57] ABSTRACT

A mounting bracket for a bird feeder adapted to be fitted to the outside of window panes divided by a mullion wherein suction cups attachable to the panes are connected by support means to an elongated member so that the elongated member is spaced from and spans the mullion, and the feeder can then be removably mounted to the elongated member.

1 Claim, 1 Drawing Sheet

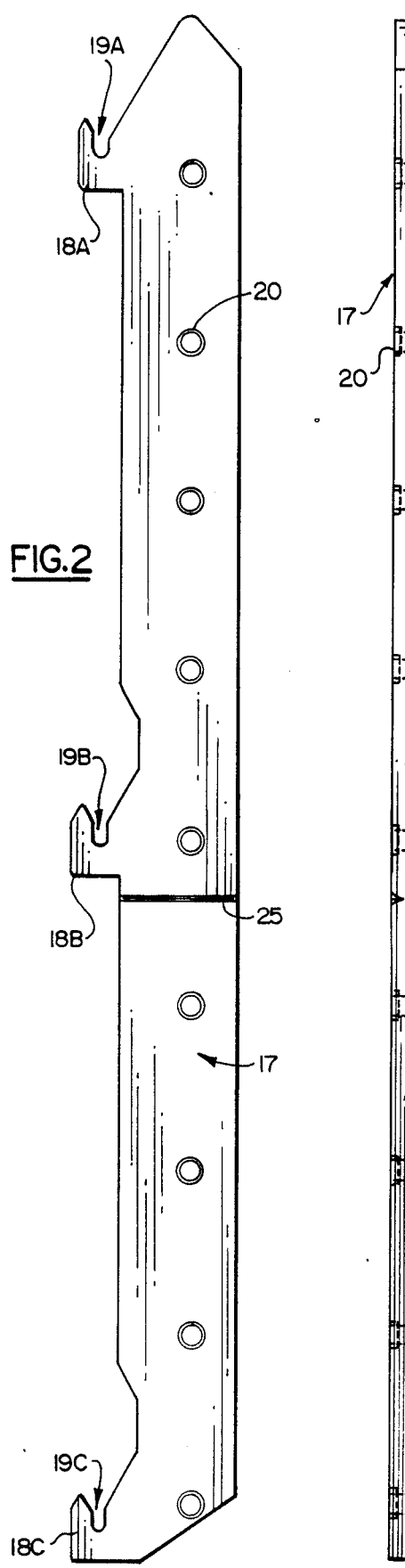
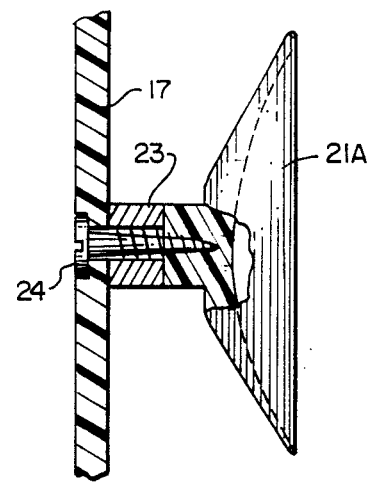
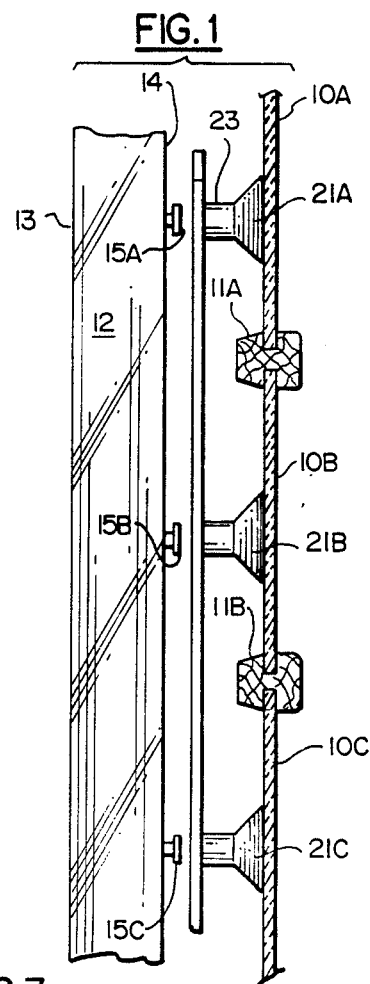
FIG. 2
FIG. 4
FIG. 1
FIG. 3

WINDOW-MOUNTED BIRD FEEDER APPARATUS

BACKGROUND OF THE INVENTION

Bird feeders frequently are mounted on the outside of windows to permit viewing of the feeding birds. In my U.S. Pat. No. 4,892,060 entitled "Bird Feeder", I have described a form of bird feeder which can be secured to a window by suction cups on the reverse side of the feeder. In that form the suction cups are affixed directly to the rear side of the feeder body adapted to face the window.

U.S. Pat. No. 4,361,116 also shows a form of bird feeder supported on the outside of a window by suction cups. In that design the feeder body is removably attached by hanger means to a mounting bracket which itself is secured to the window by the suction cups. The design of the mounting bracket and suction cups in this reference patent is such, however, that the mounting bracket must be located on the outside of a single flat pane of glass undivided by mullions.

In both of the foregoing designs no provision is made for adapting the apparatus to windows comprised of individual panes divided by mullions. Mullions are necessarily thicker than the panes they separate and therefore they extend outwardly on the exterior side of the window beyond the outer surface of the panes. It is a principal purpose of the present invention to provide an improved mounting bracket for window-mounted bird feeders which permits the bracket to be secured to the window panes without interfering with the mullions and which permits the body of the feeder to be supported by its hanger means on hanger receiving means of the mounting bracket.

SUMMARY OF THE INVENTION

The invention provides the combination of an improved mounting bracket with window-mounted bird feeder apparatus. Such apparatus comprises suction cups attachable to respective window panes divided by at least one mullion, a feeder body having a front side accessible to birds and a rear side adapted to face the window panes, and hanger means projecting from the rear side. The bracket of the invention includes a flat elongated member adapted to span the panes across the mullion. Hanger receiving means are included on the member adapted to receive the hanger means on the feeder body. A plurality of suction cup mounting holes are located in the member. Suction cup supporting means are secured in selected mounting holes for affixing the suction cups to the elongated member and spacing the member from the mullions when the suction cups are attached to the window panes. By this construction the mounting bracket can be secured to the window panes without interfering with the mullions and the feeder body can be supported by its hanger means on the hanger receiving means of the mounting bracket.

In a preferred form of the bird feeder apparatus of the invention the hanger receiving menas are upwardly facing slots or removably receiving the hanger means. The suction cup supporting means preferably includes screw means extending through the selected mounting hole into securing engagement with the suction cup and a spacer cylinder around the screw means between the elongated member and the suction cup. The elongated member may also include separation means for dividing it into shorter submembers each adapted to a relatively small feeder body. It is also preferred that a pair of the mounting brackets be employed arranged parallel to one another and vertically oriented.

BRIEF DESCRIPTION OF THE DRAWINGS

FIG. 1 is a composite vertical section showing the window panes divided by mullions with the mounting bracket attached thereto by suction cups and with the feeder body shown about to be attached to the mounting bracket;

FIG. 2 is an enlarged front view of the mounting bracket of the invention;

FIG. 3 is a side view of the mounting bracket of FIG. 2; and

FIG. 4 is an enlarged fragmentary section of one of the suction cups and supporting means attached to the mounting bracket.

DESCRIPTION OF PREFERRED EMBODIMENT

Referring first to FIG. 1 the bird feeder apparatus of the invention is intended to be mounted on a window comprising window panes 10A, 10B and 10C divided by conventional mullions 11A and 11B. The bird feeder apparatus includes a feeder body 12 which may be of various designs though that described in my aforementioned patent is particularly appropriate. The feeder body 12 has a front side 13 accessible to birds and a rear side 14 adapted to face the window panes 10A to 10C. Hanger means 15A, 15B and 15C project from the rear side of the feeder body 12 and may comprise pins with heads of larger diameter.

The improved mounting bracket of the invention comprises a flat elongated member 17 shown in detail in FIGS. 2 and 3, preferably of rigid plastic material. Along one side edge are located hook-like elements 18A, 18B and 18C which define upwardly facing slots 19A, 19B and 19C. The hook-like elements and their associated slots comprise hanger receiving means on the elongated member 17 adapted to receive the hanger means 15A, 15B and 15C on the feeder body 12.

Along the length of the elongated member 17 are formed a plurality of uniformly spaced suction cup mounting holes 20. The holes 20 may be countersunk on what is to be the exterior side of the elongated member 17 when in place on a window.

As shown in FIG. 1, three suction cups 21A, 21B and 21C are attachable to the respective window panes 10A, 10B and 10C divided by the mullions 21A and 21B. The suction cup 21A is shown in detail in FIG. 4 with its support means and is representative of the other suction cups as well. The suction cup support means for affixing the suction cup 21A to the elongated member 17 includes a spacer cylinder 23 mounted between the suction cup 21A and the member 17 and concentrially with the associated hole 20. A slotted-head screw 24 extends through the spacer cylinder 23 into securing engagement with the suction cup 20A and with the head of the screw recessed within the countersunk hole 20, all as shown in FIG. 4.

By this construction the member 17 can be secured to the window panes 10A, 10B and 10C as shown in FIG. 1 without interference by the mullions 11A and 11B, because the support cylinder 23 between the member 17 and the suction cup 21A permits the mounting bracket 17 to span across the mullions without touching them. The feeder body 12 can then be mounted by its hanger means 15C simply by moving them against the hook-like elements 18A, 18B and 18C and down into the upwardly facing slots 19A, 19B and 19C. Two such mounting brackets are preferably employed arranged parallel to one another and vertically oriented.

The purpose of the plurality of countersunk holes 20 in the elongated member 17 is to permit the suction cups and associated spacer cylinders to be attached at various selected positions along the elongated member 17 to accommodate window panes and mullions of different sizes and configurations. If only two suction cups are needed to attach a relatively small feeder body to a window, a notched crease 25 is provided across the elongated member 17 just below the middle hook-like element 18B. This comprises separation means for dividing the member 17 into shorter submembers. The elongated member 17 may be cracked off below the crease 25 and discarded if its full length is not required.

It will be apparent to those skilled in the art that various modifications may be made in the foregoing preferred embodiment of the invention without departing from the inventive concept and therefore the scope of the invention is to be determined by the following claims.

I claim:

1. In combination with window-mounted bird feeder apparatus comprising suction cups attachable to respective window panes divided by at least one mullion, a feeder body having a front side accessible to birds and a rear adapted to face the window panes, and hanger means projecting from said rear side, improved mounting brackets comprising
   (a) at least two flat elongated rigid members each spanning at least two of said panes across the mullion;
   (b) hanger receiving means on each of said rigid members for removably holding the feeder body;
   (c) a plurality of suction cup mounting holes in each of said rigid members; and
   (d) suction cup support means secured to said mounting holes for affixing the suction cups to the associated rigid members with the rigid members spanning the panes across the mullion, each of said support means comprising
      (i) screw means extending through the mounting hole into securing engagement with the associated suction cup, and
      (ii) a spacer cylinder around the screw means between the rigid member and the suction cup.

* * * * *